US012456737B2

(12) United States Patent
Ghodhbane et al.

(10) Patent No.: US 12,456,737 B2
(45) Date of Patent: Oct. 28, 2025

(54) COMPOSITION FOR MANUFACTURING AN ELECTRODE, ELECTRODE AND ASSOCIATED METHOD

(71) Applicants: UNIVERSITE GRENOBLE ALPES, Saint Martin d'Heres (FR); CENTRE NATIONAL DE LA RECHERCHE SCIENTIFIQUE, Paris (FR); INSTITUT POLYTECHNIQUE DE GRENOBLE, Grenoble (FR); COMMISSARIAT A L'ENERGIE ATOMIQUE ET AUX ENERGIES ALTERNATIVES, Paris (FR)

(72) Inventors: Myriam Ghodhbane, Grenoble (FR); Davide Beneventi, Saint Martin d'Heres (FR); Didier Chaussy, Brie et Angonnes (FR); Mohamed Naceur Belgacem, Brie et Angonnes (FR); Lionel Dubois, Verrens Arvey (FR); Abdelkader Zebda, Grenoble (FR)

(73) Assignees: UNIVERSITE GRENOBLE ALPES, Saint Martin d'Heres (FR); CENTRE NATIONAL DE LA RECHERCHE SCIENTIFIQUE, Paris (FR); INSTITUT POLYTECHNIQUE DE GRENOBLE, Grenoble (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/264,197

(22) PCT Filed: Feb. 2, 2022

(86) PCT No.: PCT/EP2022/052421
§ 371 (c)(1),
(2) Date: Aug. 3, 2023

(87) PCT Pub. No.: WO2022/167458
PCT Pub. Date: Aug. 11, 2022

(65) Prior Publication Data
US 2024/0039007 A1    Feb. 1, 2024

(30) Foreign Application Priority Data

Feb. 5, 2021  (FR) .................................. 2101130

(51) Int. Cl.
*H01M 4/90* (2006.01)
*H01M 4/86* (2006.01)
*H01M 4/88* (2006.01)

(52) U.S. Cl.
CPC ....... *H01M 4/9083* (2013.01); *H01M 4/8673* (2013.01); *H01M 4/8875* (2013.01); *H01M 4/9041* (2013.01)

(58) Field of Classification Search
CPC ............. H01M 4/8652; H01M 4/8673; H01M 4/8875; H01M 4/8882; H01M 4/9008;
(Continued)

(56) References Cited

U.S. PATENT DOCUMENTS 10,316,284 B2    6/2019  El Ichi et al.
2012/0088155 A1*  4/2012  Yushin .................. H01M 4/622
                                                   977/773
(Continued)

FOREIGN PATENT DOCUMENTS

CN     1275344 C     9/2006
FR     3119713 B1    8/2022
JP     2016058246 A * 4/2016

OTHER PUBLICATIONS

Muhmed, S. A., et al. "Emerging chitosan and cellulose green materials for ion exchange membrane fuel cell: a review." Energy, Ecology and Environment 5 (2020): 85-107 (Year: 2019).*

(Continued)

*Primary Examiner* — Matthew T Martin
*Assistant Examiner* — Jared Hansen
(74) *Attorney, Agent, or Firm* — HAUPTMAN HAM, LLP

(57) ABSTRACT

A composition for manufacturing an electrode, the composition including an electrically conductive carbon-based compound, at least one species able to form a catalyst, and (Continued)

cellulose microfibrils encapsulating chitosan. The cellulose microfibrils create a fibrous mesh binding the composition while limiting coating of the catalyst. Thus, the catalyst remains accessible to the surrounding environment, to allow the redox reactions at the electrode. The electrochemical performances of the electrode are consequently improved. The composition is furthermore particularly adapted for shaping an electrode by 3D printing.

16 Claims, 11 Drawing Sheets

(58) Field of Classification Search
CPC ............. H01M 4/9041; H01M 4/9075; H01M 4/9083; H01M 8/16; Y02E 60/50
See application file for complete search history.

(56) References Cited

U.S. PATENT DOCUMENTS

| | | | |
|---|---|---|---|
| 2016/0074305 A1* | 3/2016 | Isogai | A61K 8/345 424/401 |
| 2019/0085511 A1* | 3/2019 | Shimaoka | D21H 17/675 |
| 2019/0143308 A1* | 5/2019 | Kishimoto | H01M 4/92 502/326 |
| 2020/0381758 A1 | 12/2020 | Shiue et al. | |
| 2021/0202978 A1* | 7/2021 | Hu | H01M 4/505 |
| 2021/0313617 A1* | 10/2021 | Yushin | H01M 4/366 |
| 2022/0093936 A1* | 3/2022 | Iwata | H01M 4/96 |

OTHER PUBLICATIONS

Jang, Sang-Dong, et al. "The effect of chitosan concentration on the electrical property of chitosan-blended cellulose electroactive paper." Smart materials and structures 18.1 (2008): 015003 (Year: 2008).*
Misenan, M. S. M., et al. "Electrical and structural studies of polymer electrolyte based on chitosan/methyl cellulose blend doped with BMIMTFSI." Materials Research Express 5.5 (2018): 055304 (Year: 2018).*
Bagal-Kestwal, Dipali R., et al. "Processing methods for bionanocomposites." Bio monomers for green polymeric composite materials (2019): 25-55 (Year: 2019).*
Lizundia, Erlantz, et al. "Cellulose and its derivatives for lithium ion battery separators: A review on the processing methods and properties." Carbohydrate Polymer Technologies and Applications 1 (2020): 100001 (Year: 2020).*
JP2016058246A, Matsui. "Composition for battery electrode and battery", machine English translation retrieved from https://worldwide.espacenet.com/ Date: Apr. 1, 2025 (Year: 2016).*
Cao, Daxian, et al. "3D printed high-performance lithium metal microbatteries enabled by nanocellulose." Advanced Materials 31.14 (2019) SI pp. 1-15 (Year: 2019).*
Khalil et al., Abdul, A review on chitosan-cellulose blends and nanocellulose reinforced chitosan biocomposites: Properties and their applications, Carbohydrate Polymers 150 (2016) 216-226.
Lau et al., Carolin., Development of a Chitosan Scaffold Electrode for Fuel Cell Applications, Electroanalysis 2010, 22, No. 7-8, 793-798.
Abouzeid et al., Ragab E., Biomimetic Mineralization of Three-Dimensional Printed Alginate/TEMPO-Oxidized Cellulose Nanofibril Scaffolds for Bone Tissue Engineering, Biomacromolecules 2018, 19, 4442-4452.
Attalla et al., R., Fabrication and characterization of gels with integrated channels using 3D printing with microfluidic nozzle for tissue engineering applications, Biomed Microdevices (2016) 18:17.
Bao et al., Yinhua, 3D-printed highly deformable electrodes for flexible lithium ion batteries, Energy Storage Materials 33 (2020) 55-61.
Buchanan et al., C., Metal 3D printing in construction: a review of methods, research, applications, opportunities and challenges, Engineering Structures, 180, 332-348.
Cao et al., Daxian, 3D Printed High-Performance Lithium Metal Microbatteries Enabled by Nanocellulose, Adv. Mater. 2019, 1807313.
Castorena-Gonzalez et al., Jorge A., Biofuel Cell Operating in Vivo in Rat, Electroanalysis 2013, 25, No. 7, 1579-1584.
Cinquin et al., Philippe, A Glucose BioFuel Cell Implanted in Rats, PLoS ONE, May 2010, vol. 5, Issue 5, e10476.
Dinescu et al., Sorina, In vitro cytocompatibility evaluation of chitosan/graphene oxide 3D scaffold composites designed for bone tissue engineering, Bio-Medical Materials and Engineering 24 (2014) 2249-2256.
El Ichi et al., Sarra, Biocompatible Implantable Biofuel Cell, 2014 IEEE Conference on Biomedical Engineering and Sciences, Dec. 8-10, 2014, Miri, Sarawak, Malaysia.
El Ichi-Ribault et al., S., Laccase-based biocathodes: Comparison of chitosan and Nafion, Analytica Chimica Acta xxx (2016) 1-10.
Ferri et al., Stefano, Review of Glucose Oxidases and Glucose Dehydrogenases: A Bird's Eye View of Glucose Sensing Enzymes, J Diabetes Sci Technol 2011 5: 1068.
Foster et al., Christopher W., 3D Printed Graphene Based Energy Storage Devices, Scientific Reports, 7:42233.
Fu et al., Kun, Graphene Oxide-Based Electrode Inks for 3D-Printed Lithium-Ion Batteries, Adv. Mater. 2016, 28, 2587-2594.
Halamkova et al., Lenka, Implanted Biofuel Cell Operating in a Living Snail, J. Am. Chem. Soc. 2012, 134, 5040-5043.
Holade et al., Yaovi, Pacemaker Activated by an Abiotic Biofuel Cell Operated in Human Serum Solution, Electroanalysis 2014, 26, 2445-2457.
Hyun Kim et al., Jung, Three-Dimensional Printing of Highly Conductive Carbon Nanotube Microarchitectures with Fluid Ink, ACS Nano 2016, 10, 8879-8887.
Idrees et al., Mohanad, 3D printed supercapacitor using porous carbon derived from packaging waste, Department of Materials Science & Engineering, Chappie James Hall, Department of Electrical & Computer Engineering, Luther Foster Hall, Tuskegee University, Tuskegee, Alabama 36088, Manuscript_8cf78d22f6876299bf6f5f634571728d.
Li et al., Jie, A Hybrid Three-Dimensionally Structured Electrode for Lithium-ion Batteries via 3D Printing, 1Department of Mechanical and Aerospace Engineering, Missouri University of Science and Technology, Rolla, MO 65409, 2School of Mechanical and Materials Engineering, Washington State University, Pullman, WA 99164, Manuscript_33e3bd1c9026d94bd7af670212b39a8a.
Macvittie et al., Kevin, From "cyborg" lobsters to a pacemaker powered by implantable biofuel cells, Energy Environ. Sci., 2013, 6, 81.
Menassol, Gauthier, Fabrication et optimisation d'une biocathode abiotique pour une biopile à glucose implantable, Biotechnologies. Université Grenoble Alpes [2020 - . . . ], 2020.
Milton et al., Ross D., Employing FAD-dependent glucose dehydrogenase within a glucose/oxygen enzymatic fuel cell operating in human serum, Bioelectrochemistry xxx (2015) xxx-xxx.
Nesaei et al., Sepehr, Micro additive manufacturing of glucose biosensors: A feasibility study, Analytica Chimica Acta 1043 (2018) 142-149.
Nguyen et al., Trang,In vitro and in vivo acute response towards injectable thermosensitive chitosan/TEMPO-oxidized cellulose nanofiber hydrogel, Carbohydrate Polymers, https://doi.org/10.1016/j.carbpol.2017.10.032.
Postiglione et al., Giovanni, Conductive 3D microstructures by direct 3D printing of polymer/carbon nanotube nanocomposites via liquid deposition modeling, Composites: Part A 76 (2015) 110-114.
Qiao et al., Yun, 3D-Printed Graphene Oxide Framework with Thermal Shock Synthesized Nanoparticles for Li—CO2 Batteries, Adv. Funct. Mater. 2018, 1805899.
Reuillard et al., Bertrand, One-year stability for a glucose/oxygen biofuel cell combined with pH reactivation of the laccase/carbon nanotube biocathode, Bioelectrochemistry xxx (2015) xxx-xxx.

(56) References Cited

OTHER PUBLICATIONS

Reuillard et al., Bertrand, High power enzymatic biofuel cell based on naphthoquinone-mediated oxidation of glucose by glucose oxidase in a carbon nanotube 3D matrix, Phys.Chem. Chem. Phys., 2013, 15, 4892.
Shen et al., Kai, 3D Printing Quasi-Solid-State Asymmetric Micro-Supercapacitors with Ultrahigh Areal Energy Density, Adv. Energy Mater. 2018, 1800408.
Shirazi et al., S., A review on powder-based additive manufacturing for tissue engineering: selective laser sintering and inkjet 3D printing, Sci. Technol. Adv. Mater. 16 (2015) 033502 (20pp).
Su et al., Chun-Hao, High performance non-enzymatic graphene-based glucose fuel cell operated under moderate temperatures and a neutral solution, Journal of the Taiwan Institute of Chemical Engineers 95 (2019) 48-54.
Sun et al., Jie, A Review on 3D Printing for Customized Food Fabrication, Procedia Manaufacturing, vol. 1, 2015, pp. 308-319.
Sun et al., Chuang, 3D printing nanocomposite gel-based thick electrode enabling both high areal capacity and rate performance for lithium-ion battery, Chemical Engineering Journal 381 (2020) 122641.
Zebda et al., A., Single Glucose Biofuel Cells Implanted in Rats Power Electronic Devices, Scientific Reports, 3 : 1516, DOI: 10.1038/srep01516.
Zhao et al., Shifan, High-performance non-enzymatic biofuel cells based on an organic copper complex cathode and a nanoporous gold nanoparticle anode, Chem. Commun., 2019, 55, 1887.
Thibaut, Camille, Development of fibrous cellulosic materials for the production of bio-based 3D printed objects by extrusion, Material chemistry, Université Grenoble Alpes [2020 - . . . ], 2020. English.
Wang et al., H., Effect of the Pre-Treatment of Carbon Black Supports on the Activity of Fe-Based Electrocatalysts for the Reduction of Oxygen, J. Phys. Chem. B 1999, 103, 2042-2049.
Wang et al., Jiwen, Rheological and extrusion behavior of dental porcelain slurries for rapid prototyping applications, Materials Science and Engineering A 397 (2005) 314-321.
Wang et al., Jiwei, Toward High Areal Energy and Power Density Electrode for Li-Ion Batteries via Optimized 3D Printing Approach, ACS Appl. Mater. Interfaces XXXX, XXX, XXX-XXX.
Yao et al., Bin, Efficient 3D Printed Pseudocapacitive Electrodes with Ultrahigh $MnO_2$ Loading, Joule 3, 459-470, Feb. 20, 2019.
Zeng et al., Guisheng, Highly Dispersed NiO Nanoparticles Decorating graphene Nanosheets for Non-enzymatic Glucose Sensor and Biofuel Cell, Scientific Reports, 6:36454, DOI: 10.1038/srep36454.
Zhang et al., Erhuan, Porous $Co_3O_4$ hollow nanododecahedra for nonenzymatic glucose biosensor and biofuel cell, Biosensors and Bioelectronics 81 (2016) 46-53.
Zhang et al., Jian, 3D-printed functional electrodes towards Zn-Air batteries, Materials Today Energy 16 (2020) 100407.
International Search Report and Written Opinion issued in International Application No. PCT/EP2022/052421, dated May 2, 2022, pp. 1-7.

* cited by examiner

COMPOSITION FOR MANUFACTURING AN ELECTRODE, ELECTRODE AND ASSOCIATED METHOD

The present application is a U.S. National Phase of International Application Number PCT/EP2022/052421, filed Feb. 2, 2022, which claims priority to French Application No. 2101130, filed Feb. 5, 2021.

TECHNICAL FIELD OF THE INVENTION

The present invention relates to the field of electrode compositions and materials. It finds a particularly advantageous application in the field of electrodes of glucose biobatteries, for example for supplying implanted devices.

PRIOR ART

Active implantable medical devices are generally electrically supplied by lithium-ion batteries. Lithium-ion batteries do however have drawbacks, in particular in terms of size and service life. For example, for the new generation of implantable medical devices such as artificial organs, a compromise is required between the volume of the battery and the power delivered. Furthermore, the service life of lithium-ion batteries being limited, surgical replacement is essential every 5 to 8 years.

Biobatteries, and in particular glucose/$O_2$ biobatteries, constitute a promising alternative to lithium-ion batteries. Glucose/$O_2$ biobatteries enable chemical energy to be converted into electrical energy. This conversion is provided by catalysed redox reactions of glucose and oxygen. Biobatteries offer a theoretically long-lasting electrical supply, given that the reagents are naturally present in the tissue fluids of the human or animal body.

The catalysed redox reactions take place at the electrodes electrically connected together. Reduction of dioxygen into water occurs at the cathode, while oxidation of the glucose into gluconic acid takes place at the anode. The transfers of electrons associated with each redox reaction allow circulation of electrons between the cathode and the anode, and thus a power supply to the implantable medical device.

Usually, the electrodes comprise at least one catalyst that may be either enzymatic or abiotic and an electrically conductive carbon-based compound. The catalyst and the electrically conductive carbon-based compound are generally coated in a polymer-based binder. For example, the polymer may be chitosan or polyvinyl alcohol (commonly abbreviated to PVA).

A composition for manufacturing a glucose biobattery electrode is known from the document of Hun-Hao Su, Chia-Liang Sun, Shivan-Ying Peng, Jhing-Jhou Wu, Yuan-Han Huang, Ying-Chih Liao, *High performance non-enzymatic graphene-based glucose fuel cell operated under moderate temperatures and a neutral solution*, Journal of the Taiwan Institute of Chemical Engineers, Volume 95, 2019, Pages 48-54, ISSN 1876-1070, comprising:
  graphene as carbon source
  metallic particles of platinum and palladium as catalyst
  a binder based on Nafion®.

The binders commonly used do however have the effect of coating the catalyst. This coating isolates the catalyst from the surrounding environment, as illustrated by FIG. 1, which reduces its conductivity and reduces the accessibility of the electrolyte to the catalytic sites. This thus limits the performances of the electrode.

One object of the present invention is therefore to propose a solution improving the electrochemical performances of an electrode.

The other objects, features and advantages of the present invention will appear upon examining the following description and the appended drawings. It is understood that other advantages can be incorporated.

SUMMARY OF THE INVENTION

To achieve this objective, according to a first aspect a composition is provided for electrode manufacture, the composition comprising:
  an electrically conductive carbon-based compound,
  chitosan in powder form,
  a species able to form a catalyst.

Advantageously, the composition further comprises cellulose microfibrils, the chitosan being encapsulated in the cellulose microfibrils.

The cellulose microfibrils create a fibrous mesh binding the electrically conductive compound and the species able to form the catalyst, in the composition and in the material of the electrode formed. Compared with the binders normally used in this field, forming a homogenous binding phase that coats the catalysts, the cellulose microfibrils make it possible to bind the composition while limiting the coating of the catalyst. Thus the catalytic sites of the catalyst remain accessible to the surrounding environment, then facilitating the occurrence of the redox reactions at the electrode formed.

The chitosan being in powder form, it is encapsulated in the cellulose microfibrils. The chitosan being in powder form in the composition, it is in insoluble form in the composition. This avoids the coating of the catalyst caused by the use of chitosan in soluble form in the composition. Thus access to the catalyst is improved.

Compared with the existing solutions, the composition thus makes it possible to obtain an electrode material having good cohesion and good printability, while improving the access of the electrolyte to the catalytic sites of the catalyst. The electrochemical performances of the electrode are consequently improved.

Furthermore, the conjoint use of the cellulose microfibrils and of the chitosan in powder form improves the rheological properties of the composition, and thus facilitates the formation of the composition, for example by 3D printing. It was in fact shown during the development of the invention that the chitosan in powder form of the composition is not dissolved and improves the rheology of the composition.

A second aspect of the invention relates to an electrode intended to be electrically connected to the electrical circuit of a device, the electrode comprising a body based on a material comprising:
  an electrically conductive carbon-based compound, and
  a catalyst.

Advantageously, the body furthermore comprises cellulose microfibrils encapsulating chitosan in powder form.

The body of the electrode has the advantages described in relation to the electrode material described above. The body of the electrode has in particular good cohesion and good printability, while improving the access of the electrolyte to the catalytic sites of the catalyst, compared with the existing solutions. The electrochemical performances of the electrode are consequently improved.

A third aspect of the invention relates to an electrode intended to be electrically connected to the electrical circuit of a device, the electrode comprising a body based on a material comprising:
- an electrically conductive carbon-based compound, and
- a catalyst.

Advantageously, the body furthermore comprises pyrolysed residues of cellulose microfibrils and of chitosan.

In an alternative or complementary manner, the body has a porosity caused by the pyrolysis of cellulose microfibrils encapsulating chitosan in powder form.

The body of the electrode has the advantages described in relation to the electrode material described above. Furthermore, the pyrolysis of the cellulose microfibrils and of the chitosan also improves the microporosity of the material of the electrode. This porosity further increases the access of the electrolyte to the catalytic sites of the catalysts. The electrochemical performances of the electrode are thus also improved.

A fourth aspect relates to a method for manufacturing an electrode comprising the use of the composition. According to one example, the manufacturing method comprises:
- supply of the composition according to the first aspect,
- shaping of the composition to form a body of the electrode.

Preferably, the composition is shaped by 3D printing, which may also be equivalently referred to as additive manufacturing.

A fifth aspect relates to a device comprising an electrical circuit connected to an electrode according to the second or the third aspect, or an electrode manufactured by the method according to the fourth aspect. According to one example, the device is a biobattery, and more particularly a glucose biobattery. The device can be configured to supply a device, for example an implantable medical device.

BRIEF DESCRIPTION OF THE FIGURES

The aims, purposes, features and advantages of the invention will be better understood upon reading the detailed description of example embodiments thereof, illustrated by means of the following accompanying drawings, in which.

Figure 1:
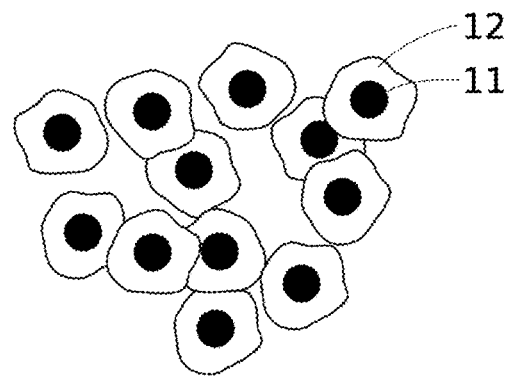
FIG. 1 shows an example of a composition for electrode manufacture of the prior art.

The drawings are provided by way of example and are not intended to limit the scope of the invention. They constitute outline diagrammatic views intended to facilitate understanding of the invention and are not necessarily to the scale of practical applications. In particular the relative dimensions of the components in the composition, of the electrode and of the device do not represent reality.

DETAILED DESCRIPTION OF THE INVENTION

Before giving a detailed review of embodiments of the invention, optional features are set out below, which can optionally be used in association or alternatively:
- the composition has a viscosity of between 250 Pa·s and 700 Pa·s, preferably between 290 Pa·s and 670 Pa·s.
- the composition has a specific surface area of substantially between 500 and 600 m$^2$/g, and preferably between 500 and 550 m$^2$/g,
- the cellulose microfibrils represent a proportion substantially of between 5% and 20%, preferably between 10% and 15%, of the total dry mass of the composition,
- the chitosan represents a proportion substantially of between 6% and 10% of the total dry mass of the composition,
- the electrically conductive carbon-based compound represents a proportion substantially of between 70% and 85%, preferably between 75% and 83%, of the total dry mass of the composition,
- the at least one species able to form a catalyst is selected from an enzymatic catalyst, metal particles, a molecular catalyst, a portion of the electrically conductive compound doped by a catalyst, a portion of the electrically conductive compound doped by a catalyst precursor, for example graphene oxide reduced and doped with an iron precursor such as a ferric or ferrous ion,
- the electrically conductive carbon-based compound is selected from graphite particles, graphene or carbon nanotubes, carbon black, mesoporous carbon.
- the electrically conductive carbon-based compound is graphene, and for example reduced graphene oxide,
- at least one species able to form a catalyst is an iron precursor, for example an iron precursor such as a ferric or ferrous ion, doping a portion of the electrically conductive compound.

Optional features of the electrode that can be used in association or alternatively are stated below:
- the body has a total volume where the filling rate by the material is less than 100%,
- the body has a total volume where the filling rate by the material is substantially between 25% and 50%, preferably substantially between 30% and 40%, and more preferentially still the filling rate is substantially equal to 40%,
- the material is disposed homogeneously in the total volume of the body,
- the electrode has a specific surface area substantially of between 500 and 600 m$^2$/g, and preferably between 550 and 600 m$^2$/g, the body comprising pyrolysed residues of cellulose and chitosan microfibrils, the electrically conductive carbon-based compound is graphene, at least a portion of the electrically conductive compound being doped by iron and nitrogen atoms to form the catalyst.

According to one example, the electrode can be surrounded, preferably entirely, by a membrane configured to limit biofouling, based on or made from PVA. According to one example, the device comprising the electrode can be surrounded, preferably entirely, by a membrane configured to limit biofouling, preferably based on or made from PVA. Thus the PVA membrane improves the biocompatibility of the electrode and/or of the device and limits biofouling thereof, in particular after implantation in a human or animal body. The device is isolated from the biological environment once implanted in a human or animal body, since use of the membrane limits the biofouling phenomenon.

Preferably, the device comprising two electrodes (and more particularly an anode and cathode), the electrodes are separated from each other by a membrane, preferably based on or made from PVA. This membrane fulfils the role of separator in order to avoid short-circuits between the electrodes.

According to one example, the PVA has a weight molar mass of between 80,000 and 125,000 g/mol.

Optional features of the method that can be used in association or alternatively are stated below:
the process can comprise:
supply of a composition according to the first aspect,
shaping of the composition by 3D printing to form a body of the electrode,
after shaping of the composition, the method comprises a pyrolysis of the body of the electrode.

An element "based on" a material A means an element comprising this material A solely or this material A and optionally other materials.

A parameter that is "substantially equal to/greater than/less than" a given value is understood to mean that this parameter is equal to/greater than/less than the given value to within plus or minus 10%, or even to within plus or minus 5% of this value.

Hereinafter, the thickness of an element and the depths are generally measured in a direction perpendicular to the main extension plane of the element, for example perpendicularly to the surface thereof.

Forming cellulose microfibrils, also called cellulose microfibres, from cellulose fibres is known. Cellulose microfibrils form a heterogeneous nanomaterial composed of elements of micrometric size, fragments of cellulose fibres, and at least 50% by number nano-objects (i.e. objects at least one of the dimensions of which is between 1 and 100 nanometres—nm). These cellulose nano-objects are called nanofibrillated cellulose, cellulose nanofibres or nanofibrils, NFC, or CNF (the abbreviation of the English cellulose nanofibrils), or microfibrillated cellulose, microfibres or microfibrils, MFC, or CMF (the abbreviation of the English cellulose microfibrils). Cellulose micro- or nanofibrils typically have a diameter of between 5 and 100 nm and a length of between 0.2 and 5 μm. It should be noted that, in the context of the present invention, the terms "cellulose microfibrils" or "cellulose microfibres" are used indifferently to designate these cellulose nano-objects.

Porosity of an element or of a material means the volume not occupied by the material of the component relative to the apparent volume of the element or of the material. This volume proportion can be occupied by the surrounding environment of the element or of the material, vacuum, gas or liquid, for example water. This proportion is delimited by a plurality of cavities. "Cavity" means a volume not occupied by the material and formed in the element or the material. The porosity of the material may be multiscale, i.e. it may comprise both a microporosity and a macroporosity. "Microporosity" means more particularly the cavities a dimension of which, for example the diameter, is substantially less than 2 nm. "Macroporosity" means more particularly the cavities a dimension of which, for example diameter, is substantially greater than 50 nm.

When an element is said to be "homogeneous" in another element or a volume, the quantity of the element per unit volume is substantially identical in every portion of a same given size of the other element or of the volume.

A metal ion generally designates an ion of a metal element in the periodic table of chemical elements.

In the present invention, the term "doping" refers to the addition of a compound or chemical element in small quantities to a compound, a substance or a material, in order to modify its electrical conductivity properties. On the electron level, the doping may consist of the addition of holes, and it is then a case of p-type doping, or the addition of electrons, and it is then a case of n-type doping.

The properties of semiconductors are to a major extent governed by the quantity of charge carriers that they contain. These carriers are the electrons or the holes. Doping a material consists in introducing, into its matrix, atoms of another material. These atoms will be substituted for some initial atoms and thus introduce more electrons or holes.

In general terms in the field of chemistry catalyst means a compound increasing the speed of a chemical reaction by participating in the reaction without forming part of the reagents and products. A catalyst makes it possible in particular to introduce new reaction pathways, for example it does not directly participate in the reaction but its presence facilitates the breaking of the bonds, or for example it participates therein and is regenerated during the reaction.

In the context of the present invention, the term chitosan refers to a polymer having a chemical formula corresponding to that of the polymer produced by deacetylation of chitin. Chitin is a polysaccharide with 2 constituent units: N-acetylglucosamine and N-glucosamine bonded together by a glycoside bond of the β-1,4 type. A simplified chemical formula (I) of chitin and of chitosan is for example given below.

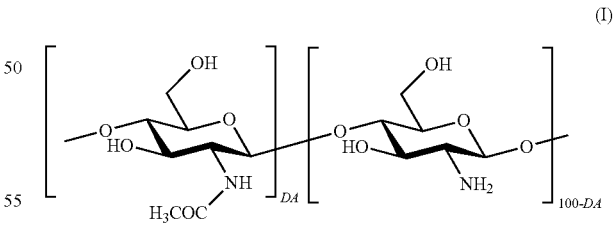

The degree of deacetylation designates the percentage of monomer units of the polymer having an amine group, of chemical formula —NH2, instead of an N-acetyl group, of chemical formula —NH—CO—CH3. The degree of acetylation designates the percentage of monomer units of the polymer having an N-acetyl group, of chemical formula —NH—CO—CH3, instead of an amine group, of chemical formula —NH2. The sum of the degree of acetylation and of the degree of deacetylation is equal to 100%. For example, a chitosan having a degree of deacetylation of 85% has 15% monomer units having an N-acetyl group and 85% monomer units having an amine group. "Chitosan" can mean the polymers corresponding to formula (I) below having a low degree of acetylation, typically less than 60%.

Figure 5:
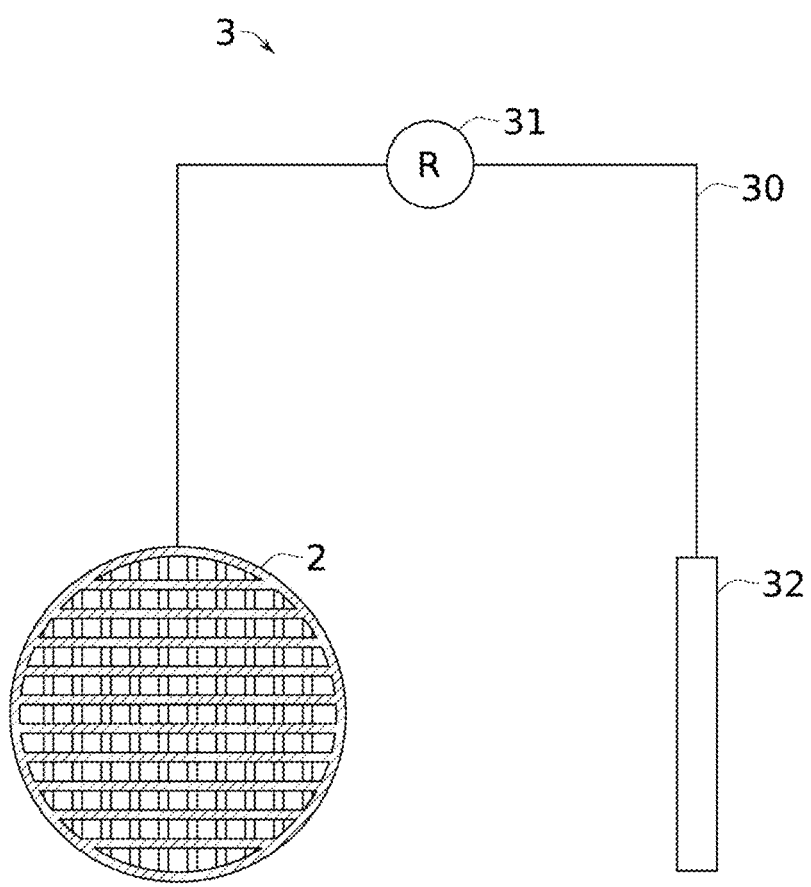
FIG. 5 shows an example of a device comprising the electrode.

Composition 1 is intended for manufacturing the electrode 2. The electrode 2 may be an electrode 2 comprising a body 20 electrically connected to the electrical circuit 30 of a device, for example illustrated by FIG. 5 and able to comprise a resistor 31. According to one example, the device 3 comprises a capacitor. The device 3 may more particularly be a biobattery, for example:
- an ethanol biobattery, configured to oxidise ethanol and reduce dioxygen,
- a methanol biobattery, configured to oxidise methanol and reduce dioxygen,
- preferably a glucose/$O_2$ methanol biobattery, configured to oxidise glucose and reduce dioxygen.

Let us note that the electrode 2 may be an anode and/or a cathode of the device 3. According to the example illustrated, the device 3 may comprise an electrode 2 according to the invention and a counter electrode 32. According to another example, the device 3 may comprise two electrodes 2 according to the invention. Preferably, the device 3 being a biobattery, the electrode 2 is a cathode, and therefore the electrode is configured to allow the reduction of chemical species, preferably dioxygen.

The composition 1, from which the material 1' of the electrode 2 can be formed, is now described with reference to FIGS. 2 and 3. The composition 1 comprises:
- an electrically conductive carbon-based compound 10,
- at least one species 11 able to form a catalyst 11', and
- cellulose microfibrils 13 encapsulating chitosan 12.

Figure 2:
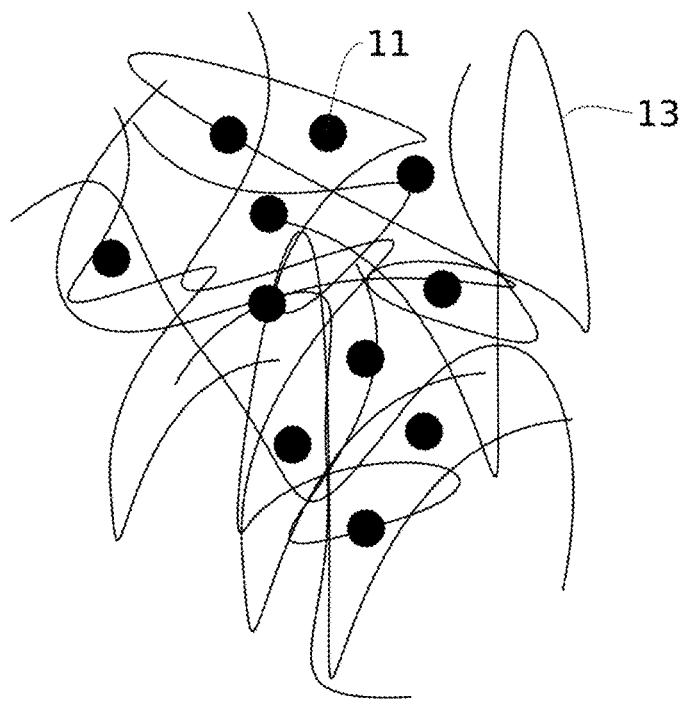
FIG. 2 shows the fibrous meshing, by the cellulose microfibres, of the species able to form a catalyst.
Figure 3:
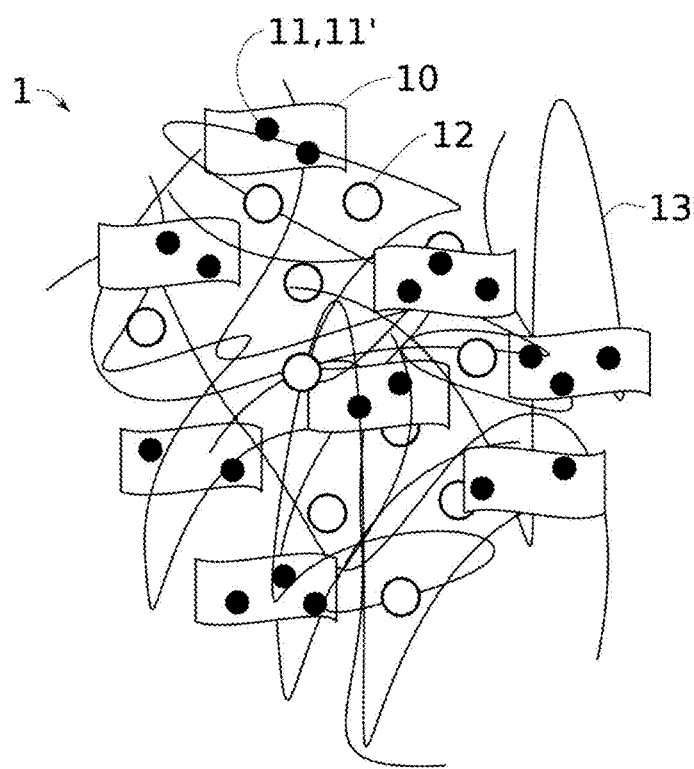
FIG. 3 shows the composition according to an example embodiment.

The cellulose microfibrils 13, hereinafter referred to as microfibrils, create a mesh in gel form, configured to bind the components of the composition 1, and more particularly the species 11 able to form a catalyst 11', as illustrated by FIGS. 2 and 3. Compared with the existing solutions, the microfibrils therefore make it possible to bind the composition 1 by limiting, and preferably preventing, the coating at least of the species 11 able to form a catalyst 11'. Consequently, in the electrode formed, contact between the catalytic sites of the catalyst 11' and the electrolyte is facilitated. A reaction between the catalyst 11' and the reagent is consequently favoured, which makes it possible to increase the electrochemical performances of the electrode 2.

This mesh can in particular give rise to microporosity of the composition 1, located in the material 1' of the electrode 2. The microporosity enables the electrolyte to infiltrate in the electrode 2 and to increase the exchange surface between the catalyst 11' in the material 1' and the reagents. According to one example, the composition 1 and the electrode formed have a specific surface area substantially of between 500 and 600 $m^2/g$, and preferably between 500 and 550 $m^2/g$.

In the composition 1, the cellulose microfibrils 13 are in a proportion substantially greater than 5%, and preferably substantially greater than 10% of the total dry mass of the composition 1, in order to ensure effective meshing. This proportion may be substantially less than 20%, preferably less than 15% of the total dry mass of the composition 1, to control the viscosity of the composition 1. These proportions of cellulose microfibrils ensure effective meshing of the electrically conductive compound and of the catalyst, while limiting the quantity of cellulose microfibrils used. This proportion furthermore makes it possible to limit the cost of the composition 1.

According to one example, the cellulose microfibrils are oxidised. For example, the hydroxyl groups located on C6 of the glucopyranose units of the cellulose are oxidised into carboxyls. Thus the cellulose microfibrils 13 have on the surface, at a substantially neutral pH, negative charges favouring dispersion thereof in the composition 1. For example, this oxidation can be implemented using the (2,2,6,6-tetramethylpiperidin-1-yl)oxy radical, also designated TEMPO, according to methods known to a person skilled in the art. Provision can be made for this oxidation to be implemented by enzymes, and in particular enzymes in the cellulase family. According to a preferential example, the microfibrils are 2% oxidised by TEMPO, i.e. substantially 2% of the hydroxyl groups located on C6 of the glucopyranose units of the cellulose are oxidised into carboxyls.

The microfibrils 13 and the chitosan 12 are configured so that the microfibrils 13 encapsulate the chitosan 12 to further limit the coating of the species 11. For this purpose, the chitosan 12 is in powder form in the composition 1. "Powder" means that the chitosan is present in a state fractionated in particles wherein at least 50% are of size substantially less than 100 μm, preferably substantially less than 10 μm, and more preferentially still substantially between 1 and 2 μm. The size of the particles can be measured by electron microscopy, and for example by scanning electron microscopy. The specific surface area of the powder can be between 0.5 and 1 $m^2/g$, and preferably substantially equal to 0.64 $m^2/g$. The powder can have a total pore volume substantially equal to 0.005 $cm^3/g$. The chitosan 12 is therefore insoluble in the composition 1. The cellulose microfibrils thus encapsulate the chitosan powder, the chitosan powder being adsorbed on the cellulose microfibrils. In an equivalent manner, the cellulose microfibrils at least partially envelop the chitosan powder particles. In a manner synergic with the mesh formed by the cellulose microfibrils, the use of chitosan in powder form makes it possible to further minimise the coating of the species able to form the catalyst, and to improve the rheology of the composition for printing thereof.

According to one example, the chitosan 12 is in a proportion at least substantially greater than 6%, in the composition 1. Preferably, this proportion substantially between 6% and 10% of the total dry mass of the composition 1. During the development of the invention, it was shown that these proportions improve the 3D printability of the composition. Furthermore, following the pyrolysis (described subsequently), the carbonisation of the chitosan in these proportions affords an optimum compromise between the microporosity obtained and mechanical strength.

It should be noted that, since the chitosan is in powder form, the molar mass thereof and the degree of deacetylation thereof will not affect the catalytic activity of the composition. According to one example, the chitosan has a weight average molar mass substantially less than 300,000 g/mol, and preferably between 50,000 g/mol and 200,000 g/mol. The chitosan may have a degree of deacetylation substantially greater than 70%, and preferably between 75 and 85%.

The electrically conductive compound 10 is based on carbon. The electrically conductive compound 10 provides electrical conductivity in the composition 1 and especially in the material 1' of the electrode. For this purpose, the proportion of electrically conductive compound 10 can at least be substantially greater than 70%, and preferably substantially between 70% and 85%, and more preferentially still between 75% and 83%, of the total dry mass of the composition 1.

At least 50%, and preferably at least 80%, of the electrically conductive compound 10 is made from carbon-based particles having at least one nanometric dimension, i.e. less than 200 nm, and preferably less than 100 nm. A nanometric dimension of the electrically conductive compound favours the homogeneous distribution thereof in the composition 1. The electrically conductive compound 10 may be: graphite particles, graphene or carbon nanotubes, or their derivatives.

Graphene has good biocompatibility with living cells. Thus the electrode, once implanted, does not cause death of the organism carrying it, or rejection thereof. In particular, an inflammatory reaction of the implanted organism is minimised, and preferably avoided. Furthermore, the electrode thus causes low, and preferably an absence of, cytotoxicity, in particular with respect to an electrode comprising carbon nanotubes. The graphene may be in the form of reduced graphene oxide. The graphene may be in the form of graphene nanoribbons. The graphene nanoribbons may have a width of less than 100 nm.

In the composition 1, the species 11 able to form a catalyst 11' may be a catalyst 11'. The catalyst 11' in the material 1' of the electrode 2 is conductive, in order to allow an electron transfer to the electrically conductive compound 10. The composition 1 may comprise a plurality of species 11 able to form a catalyst 11.

The catalyst 11' may be an enzymatic catalyst. The enzyme may be coupled to a mediator to facilitate the electron transfer between the enzyme and the electrically conductive compound 10, in accordance with techniques known to a person skilled in the art, and thus allow the electrical connection of the enzyme in the electrode. According to an alternative example, the electron transfer can take place directly between the enzyme and the electrically conductive compound. For example, the enzyme can be selected from the glucose oxidase enzyme (Gox) for oxidising the glucose, and laccase. The proportion by weight of enzyme in the composition 1 can be substantially between 20 and 30%, for example substantially equal to 22%, with respect to the total dry mass of the composition 1.

The catalyst 11' may be an abiotic catalyst, in contradistinction to enzymatic catalysts. According to one example, the catalyst 11' may be metal particles, and in particular noble metals, or an alloy of noble metals. Noble metals comprise the following metals: gold (Au), silver (Ag), rhodium (Rh), osmium (Os), palladium (Pd), ruthenium (Ru), iridium (Ir) and platinum (Pt). Preferably, the catalyst 11' may be metal particles of gold, platinum, palladium or osmium, or an alloy of these. Catalysts based on noble metals are expensive and very sensitive in physiological environments, in particular through poisoning by chloride ions. Catalysts based solely on carbon with heteroatoms generally have poor performances in a physiological environment. Catalysts based on transition metals are therefore more adapted to electrode manufacture, in particular for an application in an implanted device. According to another example, the catalyst 11' may be a molecular catalyst, i.e. non-enzymatic organic or organometallic catalysts such as porphyrins.

The species 11 able to form a catalyst 11' may be a precursor of a catalyst 11', i.e. a chemical species configured to be converted into catalyst 11' during the manufacture of the electrode 2, for example by reduction of the precursor. Use of a precursor of a catalyst 11' has several advantages. Firstly, this may constitute an alternative to enzymatic catalysts and to noble metals. Enzymatic catalysts are selective but suffer from low stability over time owing to the gradual denaturing of the enzyme. Catalysts based on noble metals are expensive. A catalyst precursor 11' generally has a lower cost compared with a catalyst, which makes it possible to limit the cost of the composition 1 and therefore of the electrode 2 formed. Furthermore, a larger quantity of precursor can be used in the composition 1, which makes it possible to increase, at lower cost, the quantity of catalyst 11' in the material 1', and therefore to increase the electrochemical performances of the electrode 2. Furthermore, a homogeneous distribution of the catalyst 11' in the material 1' is therefore facilitated.

The precursor can be chemically coupled to the electrically conductive compound 10, for example by covalent bond, by weak interactions, by Tr-Tr stacking and/or foreign hydrogenated interactions, so as to dope the electrically conductive compound 10 and form catalytic sites. According to one example, the precursor of a catalyst 11' comprises a metal ion able to act in the reduction of the oxygen once reduced. According to one example, the ion is an iron ion, in particular a ferric or ferrous ion. According to another example, the precursor of a catalyst 11' comprises a cobalt ion. The catalyst precursor 11' may in particular be a salt or a complex of the metal ion, for example iron(III) chloride of formula $FeCl_3$. Thus the conversion of the precursor into a catalyst 11' makes it possible, by reduction of the iron ions, to dope the electrically conductive compound 10 and to form iron catalytic sites. According to one example, described in more detail below, converting the precursor into a catalyst 11' makes it possible to dope, by metal ions and nitrogen, the electrically conductive compound 10. The doped electrically conductive compound 10 is then referred to as catalyst based on metal carbides and nitrides, in which the compound supports metal ions or atoms bonded to nitrogen atoms forming catalytic sites. The catalytic sites, for example based on iron and nitrogen, will act in the reduction of oxygen.

According to a preferential example, in the material 1', at least one portion 100 of the electrically conductive compound 10 is doped to form the catalyst 11. Preferably, this proportion is less than 5%, and preferably substantially equal to 2% by weight, to maximise the electrochemical performances of the electrode 2. For example, the material 1' comprises iron- and nitrogen-doped graphene. It should be noted that it is possible to provide for the composition 1 to comprise the electrically conductive compound 10, at least partly doped to form the catalyst 11', without requiring conversion during the manufacture of the electrode.

The nature of the catalyst 11' or of the species 11' can be adapted according to the application of the electrode 2, and in particular according to the redox reaction or reactions envisaged. The selection of the type of electrically conductive compound 10 can be made according to the catalyst 11' present in the material 1' of the electrode formed. Preferably, the electrically conductive compound 10 is graphene. It may be preferable to use carbon nanotubes when the catalyst 11' is an enzyme, in particular for the glucose oxidase (Gox) enzyme.

During the development of the invention, the proportions of the components of the composition 1 were in particular identified to obtain both good 3D printability and suitable electrochemical performances. Furthermore, these proportions can make it possible to achieve a viscosity particularly adapted to 3D printing of the body 20 of the electrode 2. According to one example, the composition has a viscosity of between 250 Pa·s and 700 Pa·s, preferably between 290 Pa·s and 670 Pa·s. This viscosity range, and more particularly the restricted range, are particularly adapted to forming the composition by 3D printing, described in more detail below. To achieve these viscosity ranges, the water content of the composition 1 may particularly be between 83% and 90% by weight.

The method 4 for manufacturing the electrode 2 is now described with reference to FIGS. 4 and 6 to 9. The method 4 uses the composition 1 for manufacturing the electrode 2. It should be noted that the method 4 may comprise any step configured to obtain a characteristic of the electrode 2. The method 4 comprises the supply of a composition 1. Prior to this supply, the method 4 may comprise the production of the composition 1. For this purpose, the components of the composition 1 can be mixed together. The mixture can next be homogenised to favour homogeneous dispersion of the components in the composition 1. For example, the homogenisation is implemented by a triple-cylinder homogeniser.

Figure 6:
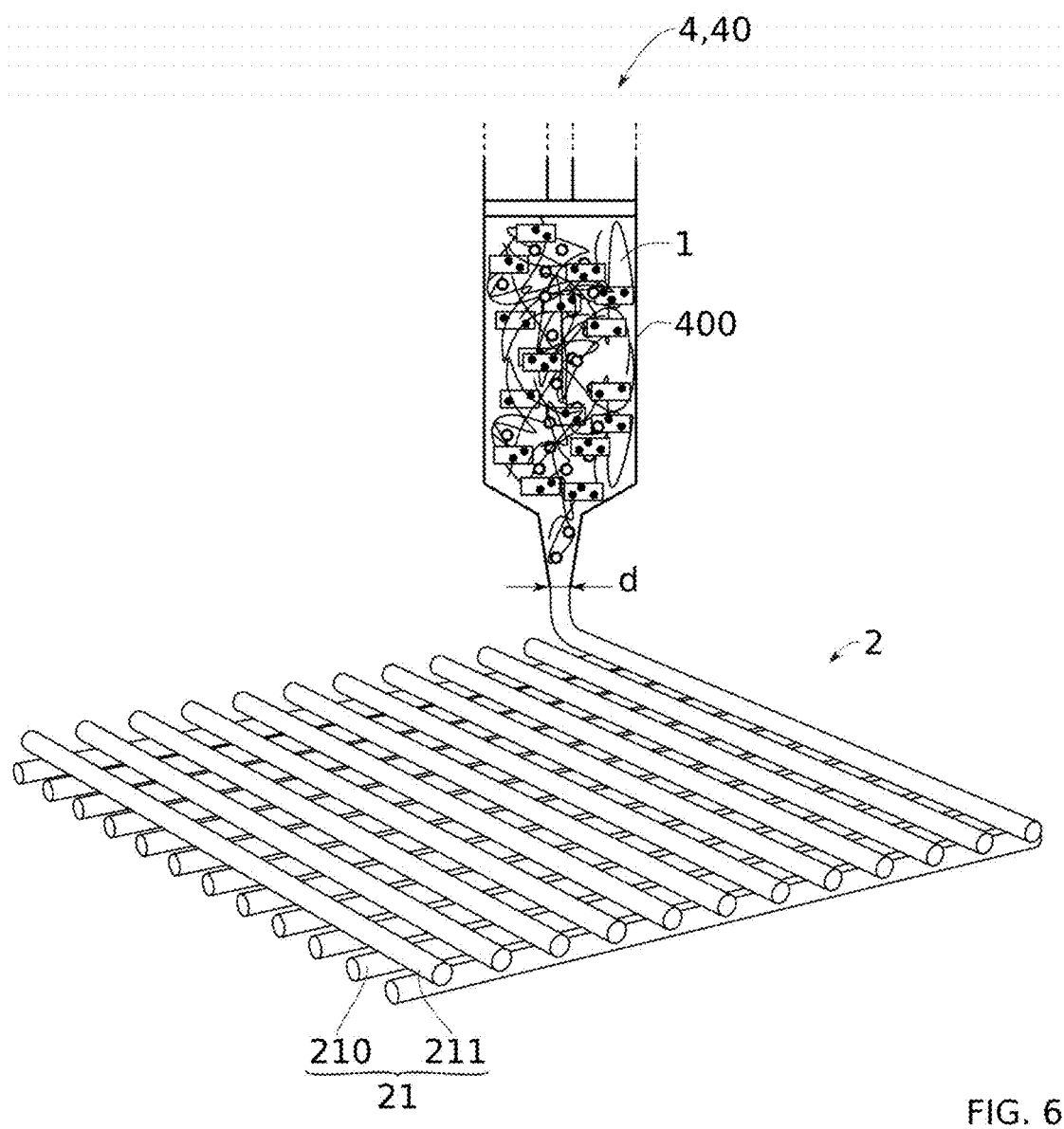
FIG. 6 shows the shaping by 3D printing of the composition illustrated in FIG. 3, according to an example embodiment.

Following the supply of the composition 1, the method 4 comprises a shaping 40 of the composition 1, to form the body 20 of the electrode. The composition 1 can be shaped by moulding, by extrusion, by screen printing, or any other method known to a person skilled in the art. According to a preferential example embodiment, the composition 1 is 3D printed, by a printing means 400 as illustrated in FIG. 6. 3D printing makes it possible to control the shape of the body 20 of the electrode 2 and in particular to control the filling rate of the body 20 of the electrode 2, described in more detail below. During the development of the invention, it was furthermore found that 3D printing gives rise to an increase in the microporosity of the composition 1 during the shaping 40, and of the material 1' of the electrode. For 3D printing, it is preferable to work at ambient temperature, since an increase in the temperature may cause drying of the composition 1 inside the printing means 400 and blocking of this means.

As illustrated in FIG. 6, the composition 1 can be printed in successive layers 210, 211 to form the volume 21 occupied by the material 1' of the body 20 of the electrode 2. A layer 210 can be formed by a plurality of extruded portions of composition 1, for example cylinders extending from one edge to the other of the body 20. The spacing between the extruded portions of a layer 210 can be varied to adjust the theoretical filling rate, described below. Between two successive layers 210, 211, the extruded portions can be oriented differently, in particular by being offset by a non-zero angle, and for example by 90° as illustrated in FIG. 6 and in FIG. 7.

The printing parameters can be optimised to avoid under-extrusion and to avoid over-extrusion that might deform the body 20 of the electrode. According to one example, the extrusion diameter D can be substantially between 0.9 and 1.1 mm, and preferably substantially equal to 0.96 mm. Furthermore, these diameters make it possible to obtain extruded portions with a diameter adapted for a satisfactory exchange surface of the body 20 of the electrode 2.

Figure 7:
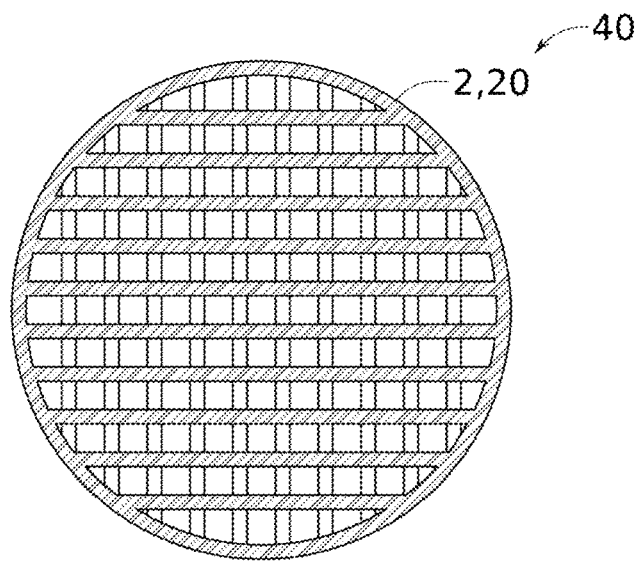
FIGS. 7 to 9 show the body of the electrode obtained according to various examples of embodiment of the method.
Figure 8:
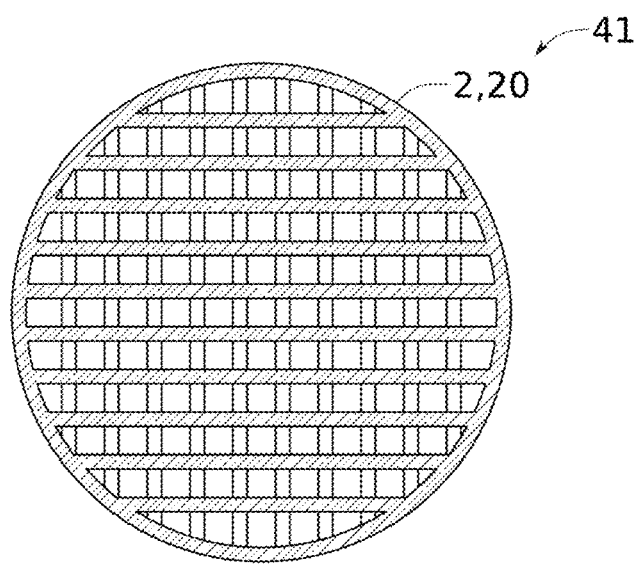
Figure 9:
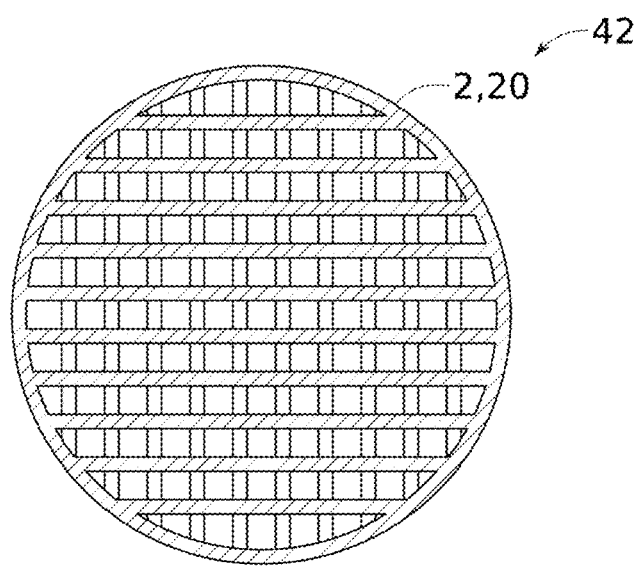

FIGS. 7 to 9 show views in cross section of the body 20 after the shaping 40. Following the shaping 40, the method 4 can comprise a drying 41, as illustrated in FIG. 8. The drying 41 can be configured so that the proportion of water in the material is less than 10%. The drying 41 makes it possible to obtain a solid material more adapted to electrode manufacture. The drying can for example be done by freeze-drying, in order to further improve the porosity of the electrode. The drying can, according to another example, the done in free air, and for example over 72 hr.

Following the shaping 40, or even following the drying 41, the method 4 can comprise a thermal annealing, and more particularly pyrolysis 42 of the composition 1, as illustrated in FIG. 9. For this purpose, the body 20 of the electrode 2 shaped can be heated to a temperature substantially higher than 500° C., and preferably substantially higher than 650° C., and more preferentially at a temperature substantially equal to 700° C. Preferably, when the electrically conductive compound 10 comprises graphene, the pyrolysis temperature is substantially less than or equal to 700° C.

Figure 4:
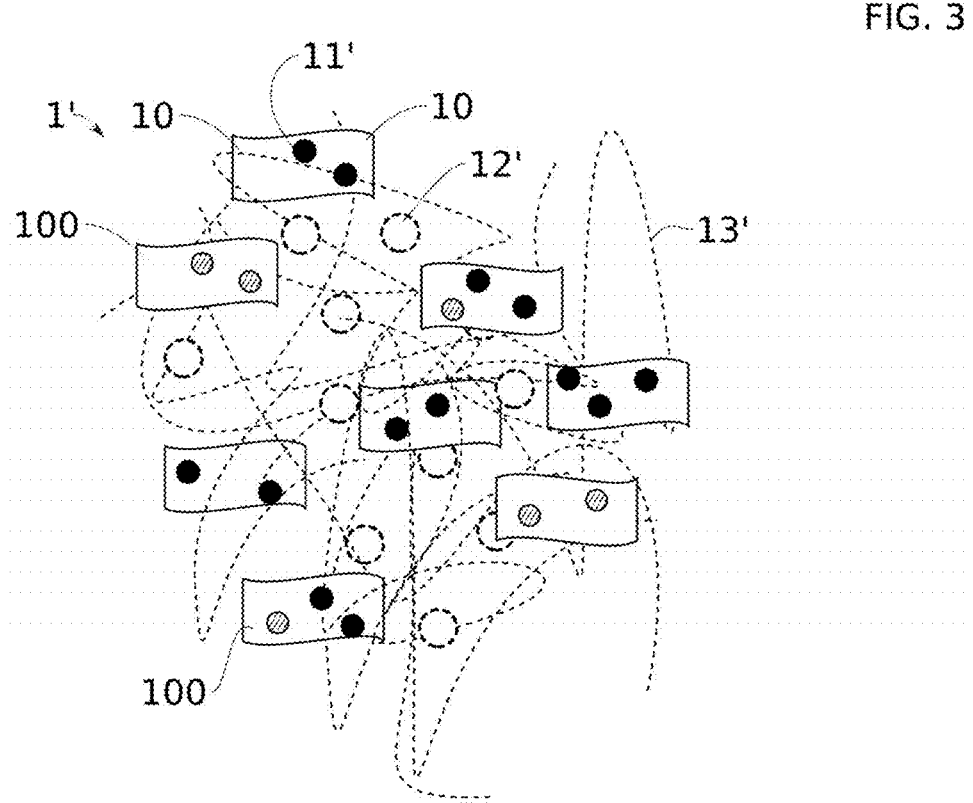
FIG. 4 shows the electrode material after pyrolysis of the composition illustrated in FIG. 3, according to an example embodiment.

The pyrolysis causes several effects on the composition 1. First of all, the microfibrils 13 and the chitosan 12 are pyrolysed, and therefore are thermally decomposed. The pyrolysis makes it possible to create porosity in place of the microfibrils 13 and chitosan 12, as illustrated in FIG. 4. The pyrolysis thus further increases the microporosity of the material 1' of the body 20 of the electrode 2, as well as the conductivity thereof, and therefore the electrochemical performances of the electrode 2. It has in particular been shown that the limit currents increase by a factor of 1.5 following the pyrolysis, in particular for a filling rate of 40%.

Furthermore, when the composition 1 comprises a precursor of a catalyst 11, the pyrolysis makes it possible to convert in situ the precursor into catalyst, for example by reducing the metal ions. As stated previously, the use of a precursor makes it possible to increase, at lower cost, the quantity of catalyst 11' in the material 1', and to dispense with the incorporation of a catalyst 11' in the composition. The losses of catalyst 11' related to any manufacturing defects during the production of the composition 1 and/or during the shaping 40 are thus limited. According to one example, when the catalyst 11' in the material 1' is doped graphene, it is possible to dispense with the use en mass of graphene particles supporting the previously synthesised catalyst 11', in the formulation of the composition 1.

Preferably, when the species 11 able to form the catalyst is an enzyme or a noble metal, the method 4 does not implement this pyrolysis step, in order to avoid degradation of the catalyst 11'.

The pyrolysis can be implemented in reactive atmosphere, to dope at least one portion 100 of the electrically conductive compound 10, for example illustrated in FIG. 4, and thus increase the activity of the catalyst 11'. An n-doping can be obtained by various methods. According to one example, the pyrolysis 42 is implemented in an atmosphere comprising ammonia so as to implement doping with nitrogen. However, high-temperature thermal reduction of graphene in the presence of ammonia can present risks. As an alternative, the pyrolysis can be implemented in the presence of a solid nitrogen precursor incorporated in the composition 1, such as melamine powder. The pyrolysis can then be implemented at a temperature substantially equal to 800° C.

Once the body of the electrode has been shaped, dried and/or pyrolysed, electrical contacts can be connected to the body 20 to form the electrode 2.

The electrode 2 is now described with reference to FIGS. 10 to 14. The electrode 2 can have any characteristic resulting from the manufacturing method described, and from the transformation of the composition 1 by the method 4. The material of the electrode can have the same proportions of dry matter as the composition 1 except when the electrode 2 has undergone pyrolysis following which the chitosan 12 and the cellulose microfibrils 13 have been carbonised.

The body 20 of the electrode 2 can have an apparent or total volume, delimited by its external periphery 200. According to the example illustrated in FIG. 10, the material 1', including the microporosity thereof, fills the apparent volume of the body 20. The filling rate of the body 20 of the electrode 2 is then considered to be substantially equal to 100%.

The filling rate of the body 20 by the material 1', including the microporosity thereof, may be less than 100%. The material 1' then fills an occupied volume 21. The apparent volume of the body 20 then comprises a free volume 22 and an occupied volume 21. The filling rate can be defined as the ratio of the occupied volume 21 to the free volume 22. The material occupying only a portion of the apparent volume of the body, the accessible surface of the electrode 2 can be modulated, and can be increased. The electrochemical performances of the electrode 2 can thus be further improved. The filling rate can be determined by measurement on the material 1', and/or can be deduced from a theoretical filling rate defined from the model on the basis of which the material 1' is printed.

According to one example, the filling rate being less than 100%, the material 1' is disposed so as to be maximised at the accessible surface of the body 20 of the electrode 2. For this purpose, the material 1' can be disposed homogeneously in the total volume of the body 20. In an equivalent manner, the occupied volume 21 and the volume 22 can be distributed homogeneously in the apparent volume, as illustrated for example by FIG. 11. Thus the body 20 of the electrode comprises a macroporosity further improving access to the catalyst 11' and therefore the electrochemical performances of the electrode 2.

The filling rate can be substantially between 25% and 50%, preferably substantially between 30% and 40%, and more preferentially still the filling rate is substantially equal to 40%. In these ranges and even more for the preferential ranges and values, the accessible surface of the electrode 2 is increased, while ensuring good mechanical properties of the body 20 of the electrode 2. A filling rate of the order of 40% makes it possible to obtain the highest electrochemical performances. Beyond these rates, clogging of the extruded filaments may occur, causing reduction in the macroporosity as well as of the electrochemical performances. In addition, a filling rate below 30% weakens the body 20.

Figure 10:
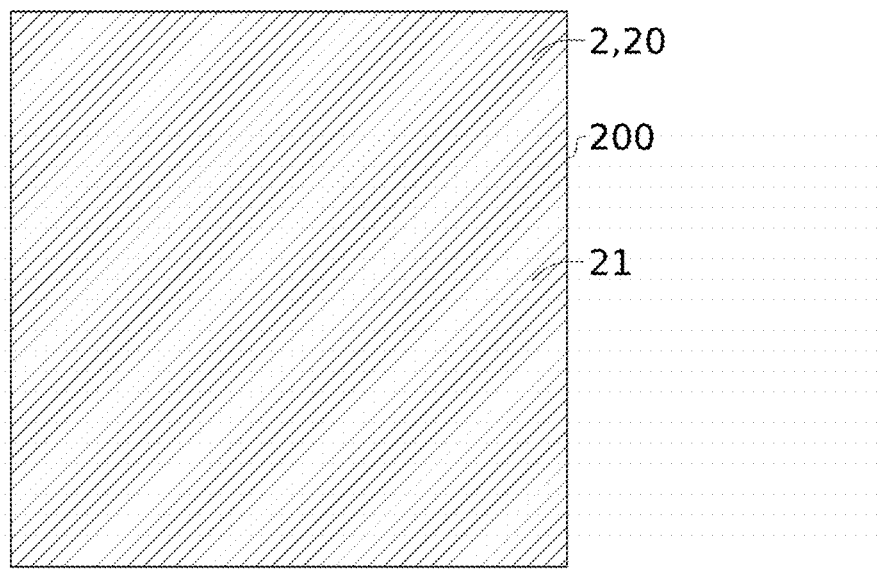
FIGS. 10 to 14 show examples of embodiment of the electrode.
Figure 11:
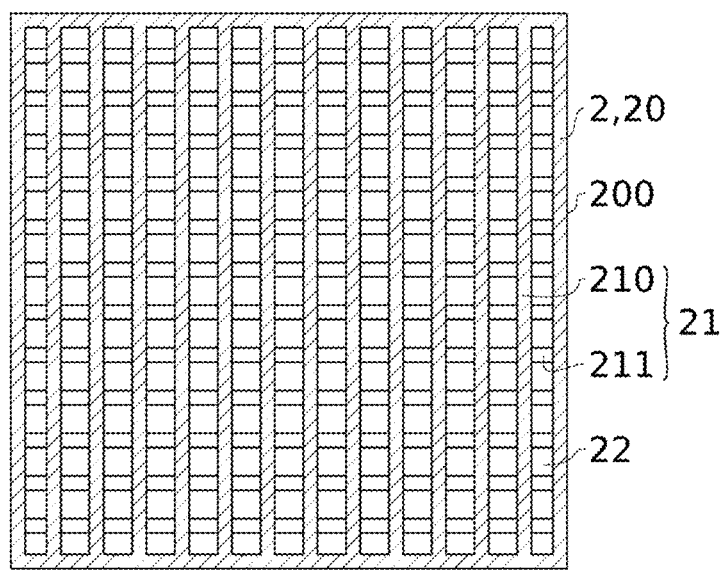
Figure 12:
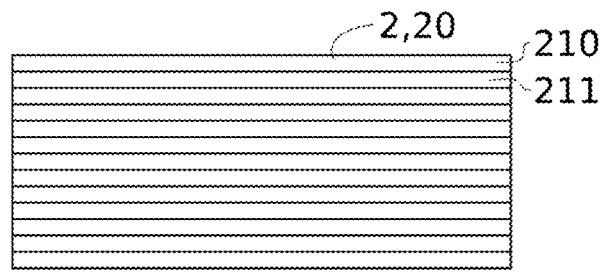
Figure 13:
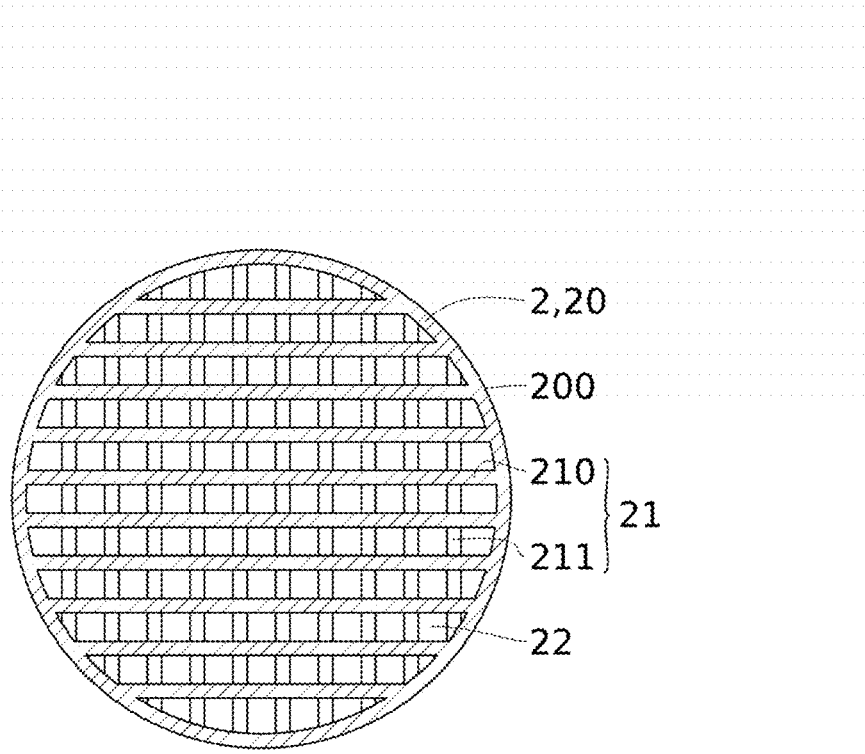
Figure 14:
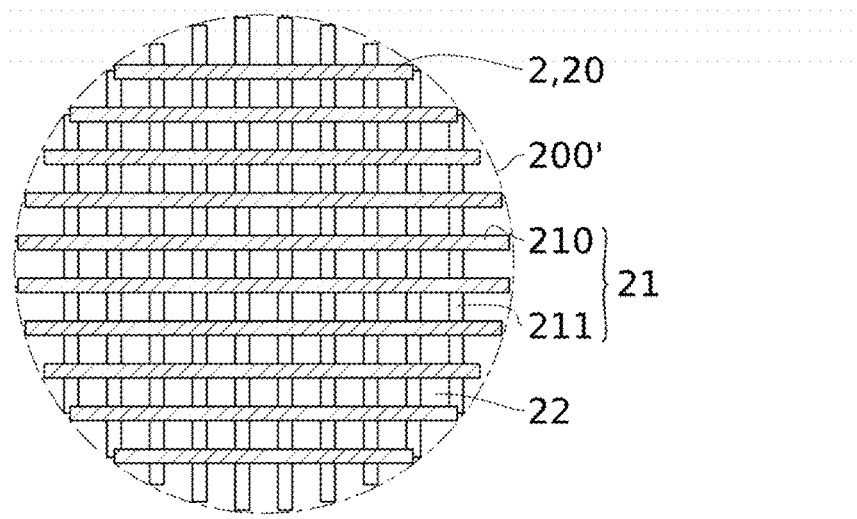

As illustrated by views in cross section in FIGS. 10 and 11, the global form of the body 20, and in particular the cross section thereof, can be polygonal, and for example rectangular or square. Preferably, as illustrated by the side view of an electrode in FIG. 12, and a view in cross section in FIG. 13, the global form of the body 20 may be a cylinder. A circular circumference 200 avoids any injury caused by acute angles of the electrode, in particular when the electrode 2 is implanted. As illustrated by FIGS. 10 to 13, the body can preferably have a continuous circumference 200, and thus further minimise the risk of any injury. In an alternative, as illustrated by FIG. 14, the body can have a discontinuous apparent circumference 200', i.e. the external circumference is not formed by a continuous band of material. According to one example, the printed portions of the electrode 2 have a diameter of less than 1 mm.

Example Embodiments

An example of a composition 1 is now described, as well as several examples of manufacture of electrodes. A detailed study was made for manufacturing a 3D-printed cathode based on iron- and nitrogen-doped graphene intended for reducing dioxygen. An optimised composition 1 was determined, in particular in terms of electrochemical performances. The composition 1 has a proportion of dry matter of 17%, and 83% water. The dry matter comprises 6.6% chitosan 12, 83.3% graphene 10, including 25% doped graphene and 10% cellulose microfibrils 13. In this example, the graphene is 2% iron-doped, i.e. a proportion of 2% by weight of the graphene is doped. The specific surface area of the composition is of the order of 536±2 $m^2/g$.

According to a first example of manufacture, after homogenisation of the composition 1 by means of a triple-cylinder homogeniser, the body 20 is 3D-printed and next dried in free air for 72 hr. The electrical contacts are then added.

The print parameters of the composition 1 are given in the following table.

| Print quality | Under-extrusion | Correct extrusion | Over-extrusion |
|---|---|---|---|
| Diameter of print means 400 (in mm) | <0.96 | 0.96 | >0.96 |
| Print speed | <5 mm/s | Between 5 and 9 mm/s | >9 mm/s |

The diameter of the printed portions of the electrode, after drying, is substantially between 684 μm and 666 μm for an extrusion diameter of 0.96 mm.

The density of the body 20 as a function of the filling rate is given in the following table.

| Filling rate (%) | 25 | 30 | 40 | 50 |
|---|---|---|---|---|
| Density of the electrode body | 0.28 | 0.314 | >0.234 | 0.348 |

Figure 15:
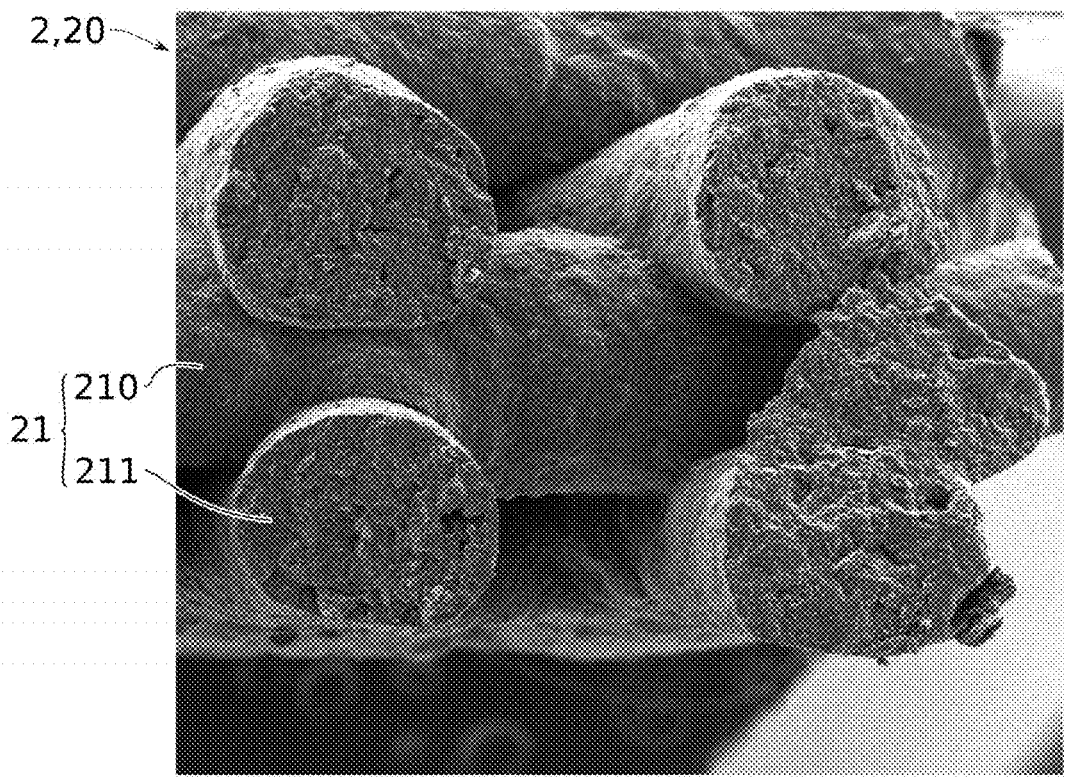
FIGS. 15 and 16 are scanning electron microscopy views of an electrode obtained after pyrolysis, according to an example embodiment.
Figure 16:
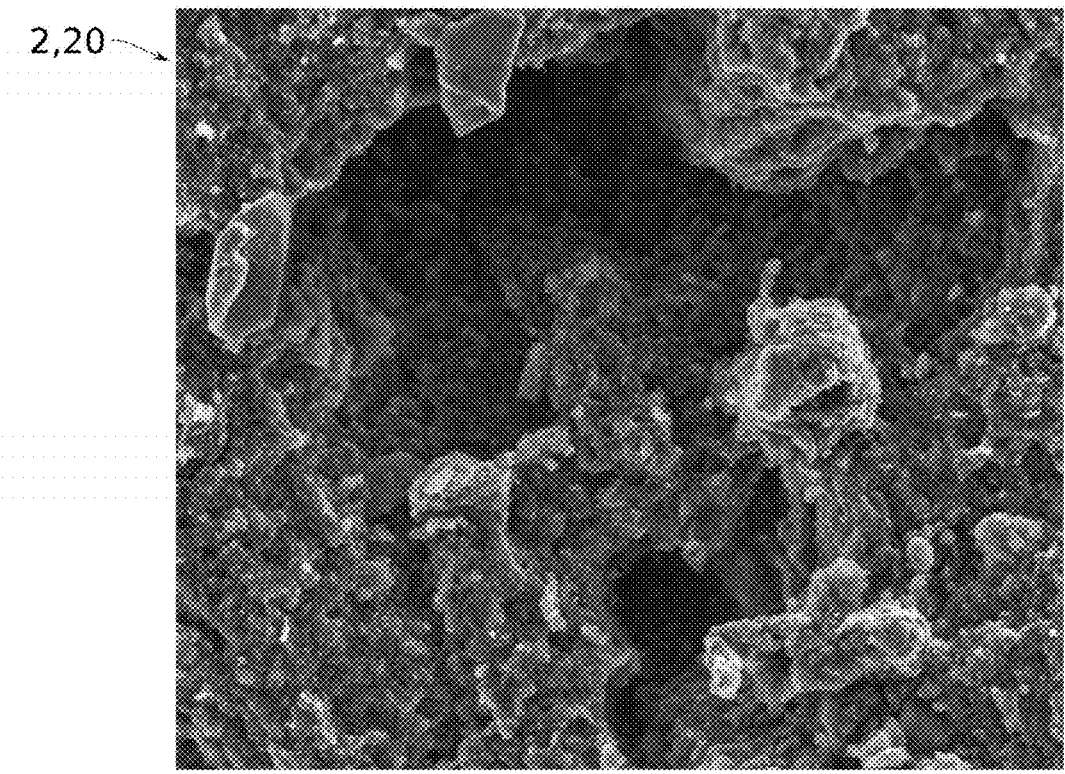

FIG. 15 illustrates the macroporosity created by a filling rate equal to 40%. FIG. 16, which is an enlargement of FIG. 15, illustrates the microporosity obtained after 3D printing. For this composition 1, the specific surface area of the 3D-printed body 20 varies between 552 and 582 $m^2/g$. The current, measured in operation, of a non-pyrolysed electrode, according to this example, is measured at approximately 400 $\mu A/cm^2$ and 8 μA/mg.

Figure 17:
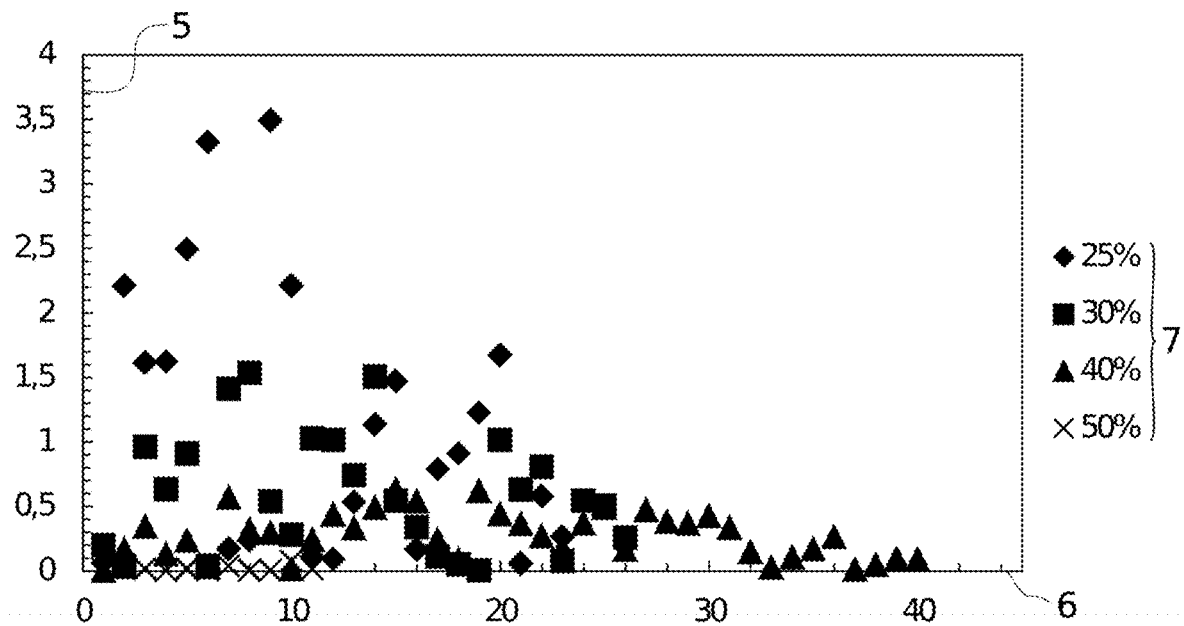
FIG. 17 is a diagram of the surface of the pores (in mm$^2$) according to the number of pores, for various filling rates.
Figure 18:
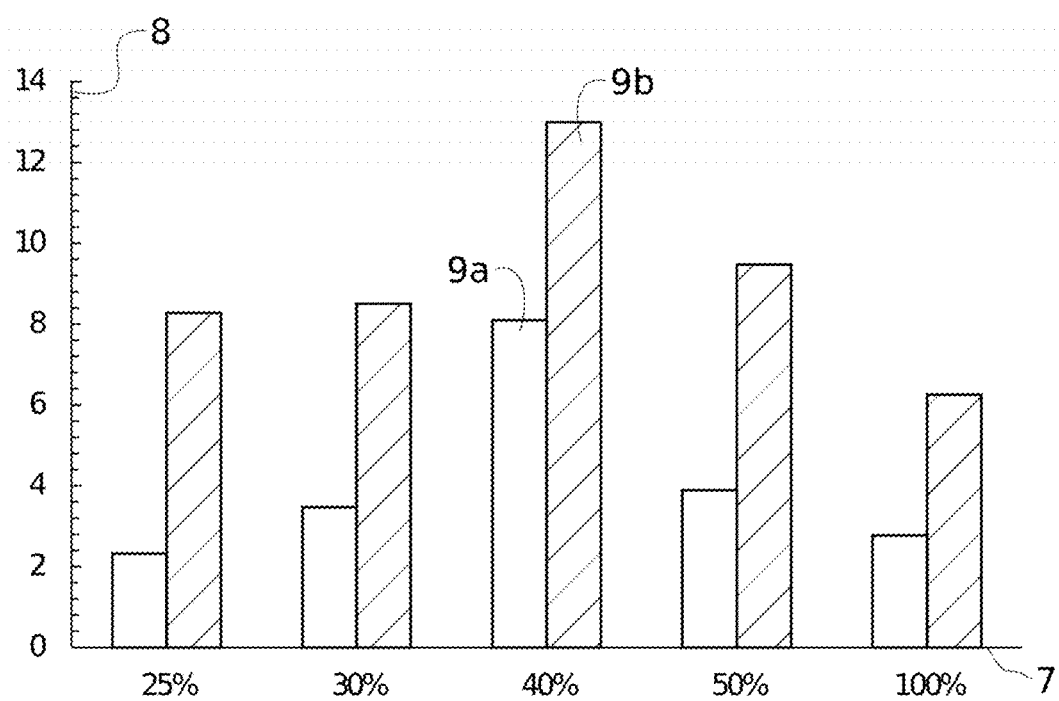
FIG. 18 is a diagram of the measured current (in μA/mg) compared with the mass of the electrode, as a function of the filling rate.

FIG. 17 illustrates the surface 5 of the pores (in $mm^2$) according to the number of pores 6, for various theoretical filling rates 7, deduced from the model from which the electrode is printed. As illustrated by FIG. 17, the filling rate of 40% makes it possible to obtain the highest number of pores and a homogeneous porous distribution, which improves the electrochemical performances. This is because, as illustrated by FIG. 18, the highest currents measured 8 (in μA/mg), and therefore the highest electrochemical performances, measured in air 9a and under oxygen 9B, are obtained for a theoretical filling rate 7 of 40%.

According to a second manufacturing example, the body of the electrode 20 is, after shaping 40 thereof, subjected to pyrolysis at 700° C. in a reactive ammonia atmosphere.

| Filling rate (%) | Percentage loss of mass following pyrolysis | Current measured operation |
|---|---|---|
| 50 | 40 | 372 $\mu A/cm^2$ |
|  |  | 12.31 μA/mg |
| 40 | 46 | 612 $\mu A/cm^2$ |
|  |  | 20 μA/mg |
| 40 (electrode not pyrolysed) | — | 400 $\mu A/cm^2$ |
|  |  | 8 μA/mg |

The filling rate and the pyrolysis thus do indeed afford an increase in the electrochemical performances of the electrode.

Figure 19A:
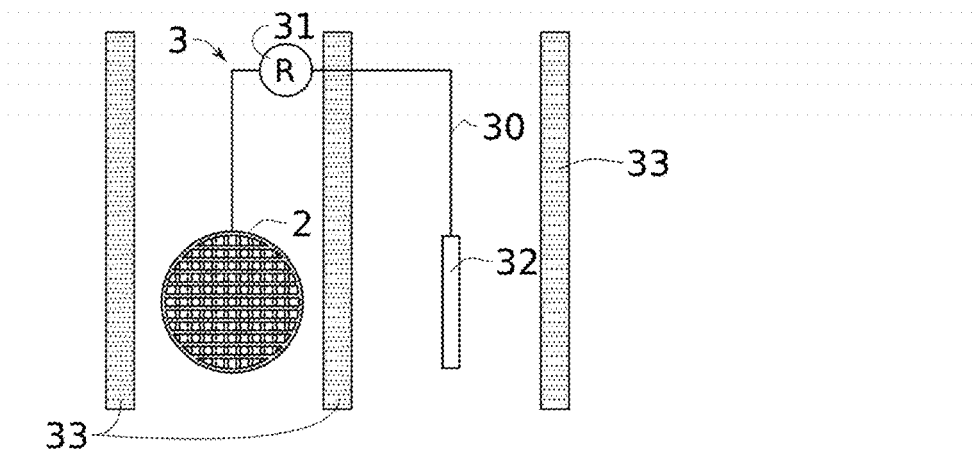
FIGS. 19A and 19B illustrate views in cross section of an example of a device comprising the electrode encapsulated in a membrane, respectively before and after sealing, according to an example embodiment.

The electrode 2 and/or the device 3 comprising the electrode 2 can be encapsulated by a membrane 33, example of PVA, in order to isolate it from the biological environment, which improves biocompatibility and limits biofouling of the electrode 2 and/or of the device 33. Other materials selected for limiting biofouling can be envisaged. This can be illustrated for example by FIGS. 19A and 19B. The PVA membrane can for example be manufactured in the manner described below. It should be noted that a person can envisage other methods for manufacturing the PVA membrane. 16 mL of DMSO and 4 mL of distilled water are heated (at a temperature T°=55° C.). 1 g of PVA (weight molar mass Mw between 85,000 and 124,000 g/mol) is weighed, which is added to the hot mixture. After 4 hr of homogenisation, the temperature is increased (65° C.) for one hour to dissolve the PVA. Once the PVA is dissolved, the beaker is placed under vacuum in order to eliminate the oxygen dissolved in solution, and then the beaker is replaced on the heated plate for a period of 15 to 30 minutes.

The PVA solution is next poured into a circular mould 1 mm thick placed between two glass plates for eliminating the excess PVA and the air bubbles. These plates are put at −20° C. for 12 hr in order to implement physical cross-linking of the PVA. After thawing, a PVA membrane is obtained.

Figure 19B:
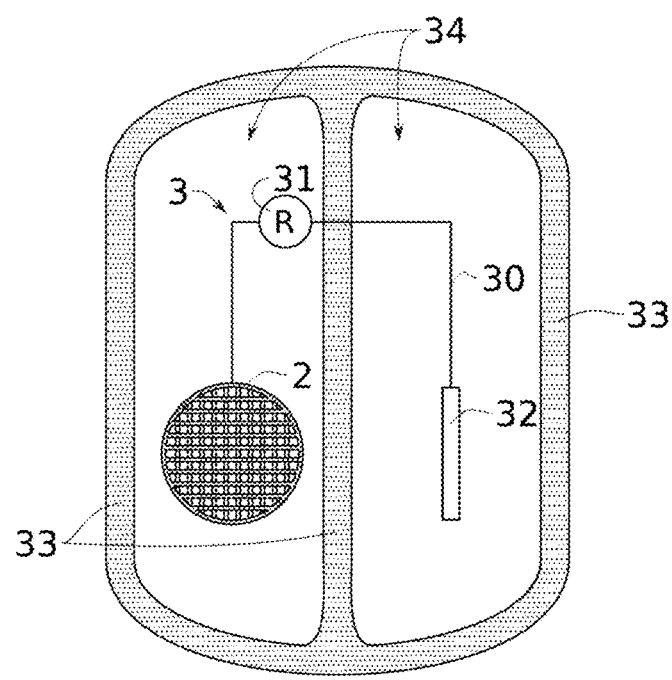

One or more membranes 33 can be formed in a sandwich, i.e. so as to separate the electrodes 2, 32 of the device 3 by the membrane 33, and so as to isolate the device from the surrounding environment, as for example illustrated in FIG. 19B. For this purpose, at least two distinct compartments 34 each intended to accommodate an electrode 2, 32 can be produced with one or more membranes 33. The resistor 31 can be placed in one or other of the compartments 34. For example, the border of three membranes 33 is begun to be sealed. Next the electrodes 2, 32 are positioned one on each side of the central membrane 33, and then the remaining borders are sealed, as illustrated for example by the change from FIG. 19A to FIG. 19B. Preferably, the pressure is maintained on the edges with clamps for an entire night in order to have complete sealing.

Furthermore, the cytocompatibility of the cathode was validated. A test of implantation of the cathode in vivo for one month in a rat was implemented, as well as a test of implementation in vivo for three months, demonstrating the feasibility of the use of a biobattery comprising an electrode according to the invention.

A cylindrical biocathode 2 having a diameter of approximately 1.3 cm and a height of approximately 0.25 cm with a theoretical filling rate of the order of 40% was manufactured according to the manufacturing method described. The biocathode 2 was connected to an enzymatic bioanode 32 based on Glucose-Dehydrogenase-Flavin-Adenine-Dinucleotide by means of an 80 kOhm resistor 31 to form a biobattery 3. The whole was encapsulated in a PVA membrane 33 in the form of a sandwich so as to avoid contact between the two electrodes 2, 32. The distance between the two electrodes 2, 32 is approximately 0.5 mm.

Next, the biobattery 3 was sterilised by exposure to ionising radiations ($^{60}$Co source), in order not to modify the structure of the PVA membrane 33 or to denature the enzymes, compared with sterilisation methods such as washing with alcohol.

Two batteries 3 were implanted in the intra-abdominal region of two rats for two different periods (one month and three months). For each implantation period, the organs of the rats (liver, kidneys, heart and lungs) were intact, no abnormality was revealed. Monitoring the weight of the implanted rats revealed no significant difference compared with a non-implanted reference rat.

For the biobattery 3 explanted after 1 month, no biological tissue coating the biobattery is observed. Adipose tissue 1 millimetre thick is formed inside the PVA membrane. This is probably due to a microperforation of the latter that caused formation of this tissue rather than inside the PVA pouch in the light of the difference in anti-biofouling behaviour between the PVA membrane and the materials of the biobattery.

For an implantation period of 3 months, the growth of a richly vascularised adipose tissue is observed. Adhesion of the latter to the mesenteric fat and stomach is noted. This tissue can easily be detached from the PVA membrane 33 because of its anti-biofouling properties. A non-biodegradability of the PVA membrane 33 is also remarked after 3 months of implantation. This cell tissue was subjected to a histological study. A quasi-absence of inflammatory reactions was observed after 3 months. These results thus show the biocompatibility of the implanted biobattery 3. The composition according to the invention does not exhibit cytotoxicity once implanted in the organism.

In the light of the above description, it is clear that the invention improves the electrochemical performances of an electrode.

The invention is not limited to the aforementioned embodiments, and includes all the embodiments covered by the invention.

LIST OF NUMERICAL REFERENCES

1 Composition, Electrode material
1' Electrode material
10 Electrically conductive carbon-based compound
100 Doped portion
11 Species able to form a catalyst
11' Catalyst
12 Chitosan
13 Cellulose microfibrils
12', 13' Pyrolysed residues
2 Electrode
20 Body
200 Periphery
200' Apparent periphery
21 Portion occupied by the apparent volume of the material
210 First layer
211 Second layer
22 Portion not occupied by the apparent volume of the material
3 Device
30 Circuit
31 Resistor
32 Counter electrode
4 Method
40 Shaping
400 Printing means
41 Drying
42 Pyrolysis
5 Surface of pores
6 Number of pores
7 Filling rate
8 Electric current
9*a* Electric current measured in air
9*b* Electric current measured in oxygen

The invention claimed is:

1. A composition for manufacturing an implantable electrode, the composition comprising water and:
an electrically conductive carbon-based compound,
at least one species able to form a catalyst, and
chitosan in powder form,
wherein the composition further comprises cellulose microfibrils forming a gel-form mesh, the cellulose microfibrils representing a proportion of between 5% and 20% of the total dry mass of the composition, the chitosan in powder form being encapsulated in the gel-form mesh formed by the cellulose microfibrils,
wherein a water content of the composition is selected in order to achieve a composition having a viscosity of between 250 Pa·s and 700 Pa·s, and wherein
the electrically conductive carbon-based compound is graphene, and
the at least one species able to form a catalyst is a nitrogen-based precursor and an iron precursor doping a portion of the graphene, the doped portion of the graphene being less than 5% by weight.

2. The composition according to claim 1, wherein the water content of the composition is between 83% and 90%.

3. The composition according to claim 1, having a specific surface area of between 536 and 600 $m^2/g$.

4. The composition according to claim 1, wherein the chitosan represents a proportion of between 6% and 10% of the total dry mass of the composition.

5. The composition according to claim 1, wherein the electrically conductive carbon-based compound represents a proportion of between 70% and 85% of the total dry mass of the composition.

6. The composition according to claim 1, wherein the at least one species able to form a catalyst is selected from a group consisting of an enzymatic catalyst, metal particles, a molecular catalyst, a portion of the electrically conductive carbon-based compound doped by a catalyst, and a portion of the electrically conductive carbon-based compound doped by a catalyst precursor.

7. The composition according to claim 1, wherein the electrically conductive carbon-based compound is selected from a group consisting of graphite particles, graphene, carbon nanotubes, carbon black, and mesoporous carbon.

8. An implantable electrode intended to be electrically connected to an electrical circuit of a device, the electrode comprising a body based on a material comprising at least one of:

a composition of water, an electrically conductive carbon-based compound, a catalyst, cellulose microfibrils, and chitosan in powder form, the cellulose microfibrils forming a gel-form mesh, the cellulose microfibrils representing a proportion of between 5% and 20% of the total dry mass of the material, the chitosan in powder form being encapsulated in the gel-form mesh formed by the cellulose microfibrils, and a water content of the composition providing the composition with a viscosity of between 250 Pa·s and 700 Pa·s, and wherein the electrically conductive carbon-based compound is graphene, and the catalyst is nitrogen and an iron doping a portion of the graphene, the doped portion of the graphene being less than 5% by weight or a material that includes a partially or wholly pyrolysed residue of the composition.

9. The electrode according to claim 8, wherein the body has a total volume where the filling rate by the material is substantially between 25% and 50%.

10. The electrode according to claim 8, having a specific surface area substantially of between 500 and 600 $m^2/g$.

11. The electrode according to claim 8, wherein the body comprises residues of cellulose microfibrils and of chitosan, and
the electrically conductive carbon-based compound is graphene, at least a portion of the electrically conductive carbon-based compound being doped by iron and nitrogen atoms to form the catalyst.

12. A method for manufacturing an electrode comprising the use of the composition according to claim 1.

13. The method according to claim 12, comprising:
supply of a composition according to claim 1,
shaping of the composition by 3D printing to form a body of the electrode.

14. The method according to claim 13, comprising, after the shaping of the composition, a pyrolysis of the body of the electrode.

15. A device comprising an electrical circuit connected to an electrode according to claim 8.

16. The composition according to claim 1, wherein at least a portion of the cellulose microfibrils is oxidized.

* * * * *